May 31, 1960     J. H. DE WITT, JR     2,939,133
EMPLACEMENT SITE LOCATING RADIO SYSTEM
Filed May 30, 1945
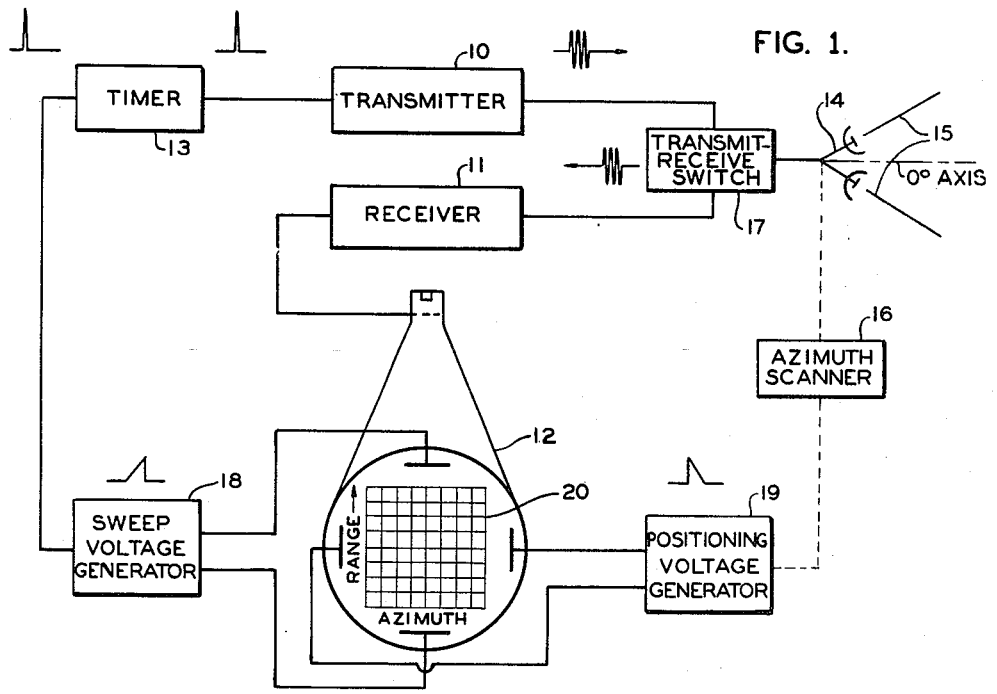
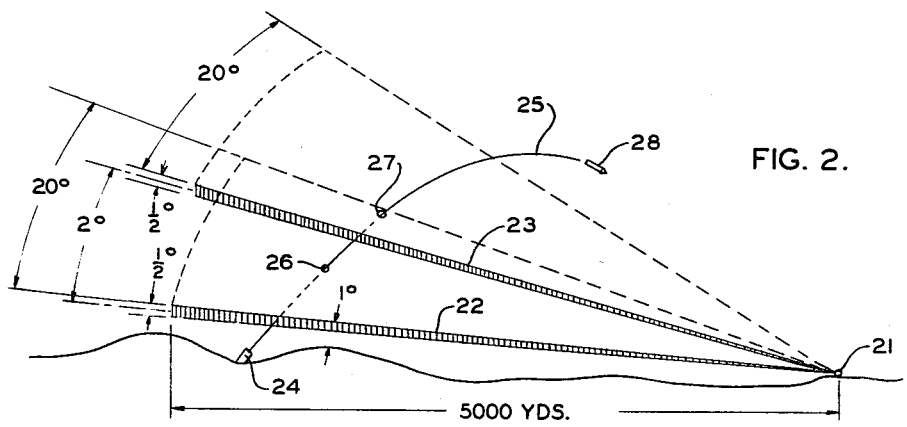
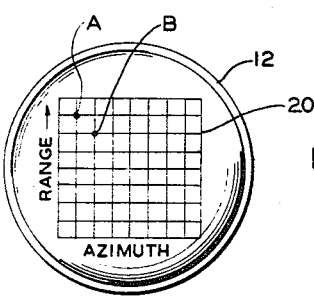
*INVENTOR.*
JOHN H. DeWITT, JR
BY
ATTORNEY

United States Patent Office 2,939,133
Patented May 31, 1960

2,939,133

EMPLACEMENT SITE LOCATING RADIO SYSTEM

John H. De Witt, Jr., Nashville, Tenn., assignor to the United States of America as represented by the Secretary of War Filed May 30, 1945, Ser. No. 596,712

6 Claims. (Cl. 343—11)

(Granted under Title 35, U.S. Code (1952), sec. 266)

The invention described herein may be manufactured and used by or for the Government for governmental purposes, without the payment to me of any royalty thereon.

The present invention relates generally to radio, pulse-echo object detection systems and more particularly to the use of such systems in locating the site of a mortar emplacement or the like.

Pulse-echo object detection systems, commonly called radar systems, generally comprise a transmitting device, disposed at an observation post, adapted to radiate in space exploratory radio frequency pulses of very short duration at frequent intervals, and a receiving device, at the same post, for intercepting and detecting returning pulses, which may be termed echoes, reflected from objects or targets whereon exploratory pulses impinge. Also included is a suitable indicator, such as a cathode ray oscilloscope, having its sweep synchronized with the period of the radiated pulses whereby images of the detected echoes are displayed along a time axis on the screen so as to provide a measure of the time interval between the emission of each radiated pulse and the receipt of a corresponding echo at the observation post. The elapsed time interval is proportional to the distance to the reflecting target, and may be translated into range units. The orientation of the transmitter radiator with respect to the reflecting target furnishes both azimuth and elevation indications which in combination with the range reading enables the exact determination of the reflecting target position. Several indicator arrangements are known in the art whereby range and azimuth or elevation may be simultaneously exhibited on a single cathode ray screen.

It is the principal object of the present invention to provide a method for locating the site of a mortar emplacement quickly, and with a high degree of accuracy, by means of a radar system installed at a ground observation post.

It is an additional object of this invention to locate the site of a mortar emplacement by means of a simple radar system not requiring servo systems for its operation or other ponderous components and, therefore, being readily transportable.

Position determining techniques other than radar, have not proven successful in locating mortar emplacements inasmuch as the characteristics of mortar shells do not lend themselves to light or sound wave detection. The small muzzle flash, low ignition noise, high angle trajectory and low transit noise of mortar shells unite to make all existing methods of mortar location unsatisfactory.

With conventional pulse-echo detection techniques various difficulties arise in locating the source of mortar fire and transmitting such information to appropriate counterfire units. It will be evident that if a ground radar installation were employed in an attempt to directly locate a mortar emplacement, the conditions of terrain are ordinarily such that an echo reflected from the emplacement could not be obtained because of the intervening ground obstacles encountered by the beam. This would be especially true where the emplacement is situated in a land depression. Accordingly it will be understood that the emplacement position must be derived from that portion of the mortar shell trajectory within unobstructed reach of the transmitter beam. Various techniques are possible based on this principle. These techniques range from methods which give a continuous plot of the shell trajectory, to methods which give only one point thereon. Equipment for making continuous accurate plots would necessarily be complicated by reason of stringent servo requirements in tracking the projectile and by the need for a complex computor. The comparatively simple equipment required to ascertain one point on the trajectory would be incapable of giving the necessary accuracy unless the shell could be detected in very close proximity to its firing origin. It can be shown that under conditions of level topography, with an antenna beam as low as one degree above the surface, the error of location using the "one point" method could be in the order of plus or minus 100 yards at a range of 5,000 yards.

Broadly stated, the present invention contemplates a radar system for fixing the position of two points on the shell trajectory and thereby accurately and rapidly locating the firing site thereof, the first of said points being at the intersection of the shell trajectory and the open line of sight closest to the earth's surface, and the second point being a few degrees thereabove in elevation. To this effect there are projected two narrow pencil beams of energy, having a fixed angular spacing in a vertical plane in relation to each other. These two beams are concurrently made to scan in azimuth a predetermined sector encompassing a mortar site. This scanning is performed at the rapid rate in the order of thirty scans per second, which rate ensures that the shell target will receive sufficient hits for positive detection. As the mortar shell pierces the lower beam it will produce a trace on the indicator tube, and at a slightly later time the same shell piercing the upper beam will provide a second trace on said indicator. The indicator is perferably of a type presenting both azimuth and range, and will, therefore, display the exact positions in azimuth and range of the shell at the instant it passes through each beam. Since the antenna beams are in fixed relation to one another, the relative location of the two echo traces on the indicator will furnish data from which the mortar firing position can be computed.

For a better understanding of this invention, as well as other objects and features thereof, reference is had to the following detailed description to be read in connection with the accompanying drawings, wherein like components are designated by like numerals. In the drawings:

Fig. 1 is a block diagram showing a preferred embodiment in accordance with the invention of a radar system for fixing the position of two points on the trajectory of a mortar shell.

Fig. 2 illustrates the radiation pattern of the two antenna beams projected by the radar apparatus disclosed in Fig. 1, and the manner in which the trajectory of a shell passes through said beams, and Fig. 3 shows a typical presentation obtained on the screen of the cathode ray oscilloscope incorporated in the radar system disclosed in Fig. 1.

Radar systems now in existence vary greatly as to detail. While a preferred system is to be described, it will be manifest that other arrangements are feasible within the scope of the invention as set forth herein and defined in the accompanying claims.

Referring now to the drawings, and more particularly to Figure 1, there is shown in simplified, functional, block form a diagram of the radar system comprising a transmitter 10 for generating radio frequency energy in the shape of short powerful pulses, and a receiver 11 for detecting and amplifying the radio frequency echoes returned by a target. The video pulses yielded in the output of receiver 11 are impressed on the intensity control electrode of a cathode ray tube 12, arranged to simultaneously visually indicate the azimuth and range of the echo traces appearing thereon. A timer circuit 13 is included, supplying synchronizing signals which act to time the transmitter pulses and the operation of indicator 12. The transmitter pulses are fed to a highly directional antenna 14 which is adapted to simultaneously radiate two pencil beams of pulse energy 15, having a fixed angular separation in relation to each other in the vertical plane. For this purpose parabolic reflectors may be employed, or any other suitable means, such as wave guides, giving the desired directivity.

Azimuth scanning means 16 are provided in conjunction with antenna 14, capable of scanning a limited area as, for example, a 20° sector, at a rapid rate, such as in the order of thirty scans per second. Provisions are included for the manual change of said sector to any desired direction. Also included are means (not shown herein) for manually shifting the dual beam 15 in elevation above or below the zero degree axis, i.e., the axis parallel to the earth's surface, in order to conform to topographical conditions. In practice it has been found that elevational shifting means should permit positioning from at least minus 5° to plus 10° in elevation.

A transmit-receive switch 17 is provided for alternately connecting antenna 14 to the output of transmitter 10 and the input of receiver 11. Switch 17 must be capable of acting within a time interval of a few microseconds, as the receiver should be tied in the antenna circuit immediately after the transmission of the pulse in order to detect close range targets. Any suitable electronic device of the type adapted to perform this function may be employed herein.

A sweep voltage generator 18 is provided whose sawtooth output wave is applied to the vertical deflecting electrodes of cathode ray tube 12. The sweep generator 18 is triggered by timer 13 whereby at the instant of pulse transmission the sweep voltage proceeds to linearly deflect the cathode ray beam in a vertical direction. The sweep voltage is adjusted so that it attains its maximum after a time interval sufficient to receive echoes from targets within the desired range of the system.

The intensity control electrode of cathode ray tube 12 is biased beyond cutoff so that initially no trace is visible on the tube screen. The video pulse developed in the output of receiver 11 is amplified to an extent whereby it overcomes the cutoff bias on the intensity grid of cathode ray tube 12 and causes a luminescent trace to appear on the tube screen. Since for each shell fired there will be but two brief series of echo pulses received, the persistence of the screen material is preferably such that the resultant traces will remain visible on the screen for several seconds.

A positioning voltage generator circuit 19 is associated with the azimuth scanner 16, either mechanically or by other suitable means, in a manner whereby a voltage is produced whose amplitude is proportional to the degree of displacement of antenna 14 from the zero or reference position in the azimuth sector scanned, and whose polarity depends upon the direction of said displacement. Positioning voltage generator 18 in its simplest form may consist of a potentiometer shunted across a power source and coupled to the shaft of antenna 14 in a manner whereby the potential and polarity at the potentiometer brush is a function of antenna position.

Superimposed over the screen of cathode ray tube 12 is a grid scale 20. It will be seen that in the absence of a sweep voltage on the vertically deflecting electrodes of tube 12 and with the cathode ray beam initially set at the center point on the base line of scale 20, the cathode ray beam will be horizontally deflected in accordance with the antenna position in azimuth, and, therefore, said base line may be graduated in degrees with the center point serving as a reference position. It will also be seen that in the absence of a positioning voltage on the horizontally deflecting electrodes of cathode ray tube 12, the output of sweep voltage generator 18 may be adjusted to deflect the beam in a vertical direction from the base line to the upper limit of scale 20. Since the vertical position of the trace with respect to the base line is proportional to the time elapsed between transmission of the pulse and receipt of the echo, the height line of the scale 20 may be calibrated in terms of range.

Inasmuch as the tube 12 is normally cutoff biased, no trace will appear on the screen until an echo pulse is received. The exact position taken by the luminescent spot upon the receipt of an echo pulse will be determined by the combined influence of the sweep voltage and positioning voltage present at the instant of echo pulse arrival, and will therefore serve as an index to the target position both in range and azimuth. Reading of the scale 20 is facilitated by the vertical and horizontal coordinates.

To enhance the accuracy of the system, any conventional electronic marker circuit (not shown herein) may be employed to provide dial indications of azimuth and range. A marker is produced which is moved along the range sweep to the position of the echo trace whose range is desired. The control which causes this motion is calibrated directly in yards so that the range may be read from the setting of the control. The azimuth marker is operated in a like manner. The marker controls, if desired, may be mechanically linked to a recorder whereby range and azimuth readings will be imprinted on a paper tape. As a further refinement, means may be incorporated in conjunction with the range marker for expanding a section of the scale.

To further clarify the operation of the invention in locating a mortar emplacement there is illustrated in Fig. 2 of the drawing the antenna pattern established with the radar apparatus disclosed in Fig. 1. At the observation post 21 there are transmitted two beams 22 and 23 having a fixed angular spacing to each other in the vertical plane. By way of illustration this system may be assumed to have an operating range of 5,000 yards with the angular separation of beams 22 and 23 being two degrees and the width of each beam being one-half of one degree. It will further be assumed that the dual beams 22 and 23 scan a 20° sector in azimuth and that the lower beam 22 makes a one degree clearance from the highest projection lying within the terrain separating observation post 21 from a mortar emplacement 24.

The trajectory described by a shell 28 fired from an emplacement 24 is indicated by curve 25. It will be seen that the trajectory pierces beams 22 and 23 at points 26 and 27. Consequently on the oscilloscope screen, as shown in Fig. 3, there will appear two traces, A and B, trace A providing an index to point 26 in Fig. 2 and trace B to point 27. It will be noted that the azimuth and range of trace A relative to trace B is governed by the time elapsing between the instant beam 22 is pierced, and the angular course taken by trajectory curve 25 with respect to the beams. By close observation of the sequence of echo traces on the oscilloscope screen, the operator is able to ascertain which portion of the shell trajectory is being detected. The echo sequence is significant in that a rising shell first pierces the lower beam 22 and then the upper beam 23, the converse being true when the shell is on its downward path.

Since the azimuth and range of points 26 and 27 on the trajectory 25 of shell 28 fired from emplacement 24 are given by cathode-ray indicator 12 and the elevation of points 26 and 27 is determinable from the known fixed angular positions of beams 22 and 23, it will be understood that the origin or muzzle point of trajectory 25 may be calculated by extrapolating points 26 and 27. This operation may be performed mathematically or, if preferred, by the use of a mechanical computer of any suitable design such as the type disclosed in the copending application of Hyman Yamins, entitled Plotter Computer, filed October 30, 1945, Serial Number 596,714, now U.S. Patent No. 2,472,138.

By the use of this computer device, there is provided what in effect is a three-dimensional, physical representation of the indicator display with additional provisions for the extrapolation of the two target points back to the point of origin.

While there has been described what is at present considered a preferred embodiment of the invention, it will be obvious to those skilled in the art that various changes and modifications may be made therein without departing from the invention. For example, referring back to Fig. 1, instead of the cathode ray oscilloscope 12 there may be substituted a tube of the panoramic type displaying range and azimuth readings in polar coordinates. Moreover, instead of employing a single transmitter and receiver to produce a dual beam and receiving echoes therefrom, the same result may be attained by the use of two distinct radar systems operating on different frequencies for locating two points on the trajectory of a shell.

It is, therefore, aimed in the appended claims to cover all such changes and modifications as fall within the true spirit and scope of the invention.

What is claimed is:

1. The combination, in a system for locating the site of an emplacement, comprising means for simultaneously transmitting two non-intersecting beams of pulsed wave energy having a fixed angular spacing in the vertical plane in relation to each other, means for receiving echoes from the two points that a projectile fired from said emplacement intersects said two beams, and means for indicating said echoes so as to depict the range and azimuth of said two points whereby the site of said emplacement may be computed by extrapolation of said two points indicated upon said last named means by said echoes.

2. The combination, in a system for locating the site of an emplacement, comprising a transmitter for generating pulsed wave energy, a directive antenna connected to said transmitter for simultaneously projecting two non-intersecting pencil beams having a fixed angular spacing in relation to each other in the vertical plane, means for rapidly scanning said two beams in azimuth concurrently whereby said beams intersect, at two points on its trajectory, a projectile fired from the emplacement, a receiver connected to said antenna for detecting echoes reflected from said two points, and an indicator connected to the output of said receiver, said indicator displaying said echoes from said two points so as to indicate the range and azimuth of said two points, whereby the site of said emplacement may be calculated by extrapolation of said two points displayed by said indicator.

3. The combination, in a system for locating the site of an emplacement, comprising a transmitter for generating pulsed wave energy, a directive antenna connected to said transmitter for simultaneously projecting two non-intersecting pencil beams having a fixed angular spacing in relation to each other in the vertical plane, means for rapidly scanning said two beams concurrently in an azimuth sector encompassing the emplacement, whereby said beams intersect, at two points on its trajectory, a projectile fired from said emplacement, a receiver connected to said antenna for detecting echoes reflected from said two points, and a cathode ray oscilloscope, connected to the output of said receiver, said oscilloscope displaying said echoes from said two points in range and azimuth coordinates, whereby the site of said emplacement may be calculated by extrapolation of said two points depicted upon said oscilloscope by said echoes.

4. The combination, in a system for locating the site of an emplacement, comprising a transmitter for generating pulsed wave energy, a directive antenna connected to said transmitter for simultaneously projecting two non-intersecting pencil beams having a fixed angular spacing in relation to each other in the vertical plane, means for rapidly scanning said two beams concurrently in an azimuth sector encompassing the emplacement, whereby said beams intersect, at two points on its trajectory, a projectile fired from said emplacement, a receiver connected to said antenna for detecting echoes reflected from said two points, and a cathode ray oscilloscope, connected to the output of said receiver, said oscilloscope displaying said echoes from said two points in polar range and azimuth coordinates, whereby the site of said emplacement may be calculated by extrapolation of said two points depicted upon said oscilloscope by said echoes.

5. The combination of claim 2, wherein said beams have a fixed angular spacing of two degrees.

6. The combination of claim 5, wherein said beams concurrently scan a twenty degree sector in azimuth.

References Cited in the file of this patent

UNITED STATES PATENTS

| | | |
|---|---|---|
| 2,176,469 | Moueix | Oct. 17, 1939 |
| 2,409,462 | Zworykin et al. | Oct. 15, 1946 |
| 2,422,333 | Bedford | June 17, 1947 |
| 2,462,456 | Bedford | Feb. 22, 1949 |
| 2,463,233 | Alexanderson | Mar. 1, 1949 |

OTHER REFERENCES

"Radar Systems Fundamentals," War Dept., April 28, 1944, TM11-467, published by U.S. Printing Office.